(12) United States Patent
Mittleman et al.

(10) Patent No.: US 8,229,153 B2
(45) Date of Patent: Jul. 24, 2012

(54) MICROPHONE PACKAGING IN A MOBILE COMMUNICATIONS DEVICE

(75) Inventors: Adam D. Mittleman, San Francisco, CA (US); Richard P. Howarth, San Francisco, CA (US); Chad G. Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 739 days.

(21) Appl. No.: 12/342,991

(22) Filed: Dec. 23, 2008

(65) Prior Publication Data

US 2009/0245564 A1 Oct. 1, 2009

Related U.S. Application Data

(60) Provisional application No. 61/041,532, filed on Apr. 1, 2008, provisional application No. 61/044,347, filed on Apr. 11, 2008.

(51) Int. Cl.
*H04R 19/04* (2006.01)

(52) U.S. Cl. ........ 381/361; 381/191; 381/355; 381/365; 381/395

(58) Field of Classification Search ................ 381/162, 381/345, 370, 328, 317, 56, 57
See application file for complete search history.

(56) References Cited

U.S. PATENT DOCUMENTS

| | | | |
|---|---|---|---|
| 5,828,012 A | 10/1998 | Repollé et al. | |
| 6,442,194 B1* | 8/2002 | Yasuno et al. | 375/219 |
| 6,512,834 B1 | 1/2003 | Banter et al. | |
| 6,785,395 B1 | 8/2004 | Arneson et al. | |
| 7,110,536 B2 | 9/2006 | Hampton et al. | |
| 7,466,837 B2 | 12/2008 | Nakamura | |
| 7,792,319 B2 | 9/2010 | Kimura et al. | |
| 7,797,025 B2 | 9/2010 | Hawker et al. | |
| 2006/0293091 A1 | 12/2006 | Hawker et al. | |
| 2007/0116261 A1 | 5/2007 | Hawker et al. | |
| 2009/0245565 A1 | 10/2009 | Mittleman et al. | |
| 2009/0247244 A1 | 10/2009 | Mittleman et al. | |

* cited by examiner

*Primary Examiner* — David Vu
*Assistant Examiner* — Jonathan Han
(74) *Attorney, Agent, or Firm* — Blakely, Sokoloff, Taylor & Zafman LLP

(57) ABSTRACT

In one aspect, a boot located inside a mobile device holds a microphone. The boot has a straight, front chamber section whose mouth is aligned (vertically and horizontally) with a microphone-associated, acoustic case opening in a sidewall of the outer housing of the device. In another aspect, the front chamber section is defined by a front sidewall on whose outer surface a circumferential rib is formed. This portion of the boot sidewall is disposed within a tube section (which may be formed in the sidewall of the device's outer case), to form an acoustic seal around the mouth of the boot. Other embodiments are also described.

17 Claims, 5 Drawing Sheets

MICROPHONE PACKAGING IN A MOBILE COMMUNICATIONS DEVICE

This application claims the benefit of the earlier filing date of U.S. provisional application Nos. 61/041,532 filed Apr. 1, 2008 and 61/044,347 filed Apr. 11, 2008.

An embodiment of the invention is directed to an arrangement for packaging or housing a microphone, and providing an acoustic or sound path to it, in a portable handheld electronic communications device such as a cellular telephone handset. Other embodiments are also described.

BACKGROUND

Cellular telephone handsets and smart phone handsets have within them a microphone that converts input sound pressure waves produced by the user speaking into to the handset, into an output electrical audio signal. Typically, the microphone is designed to pick up the user's speech while the user is holding the handset next to her ear, during a cellular telephone call for example. Although the sensitivity of the microphone itself is of course a factor in how well the other side of the conversation can hear the user's speech, the manner in which the microphone is packaged inside the relatively tight confines of the handset also plays a big role.

SUMMARY

Several arrangements for packaging or housing a microphone embedded in a mobile communications device are described.

In one aspect of the invention, the embedded microphone is packaged in such a way that a straight path, i.e. without any right angle turns, is created for the external sound waves to reach the microphone's sound input port, which may improve performance of the microphone. In particular, a microphone boot is used that is located inside the outer housing or case of the device. The microphone is held within a rear chamber section in the boot. The boot has a straight, front chamber section whose mouth is aligned (vertically and horizontally) with a microphone-associated, acoustic case opening or hole, in a sidewall of the outer housing of the device. The other end of the front chamber section opens into the rear chamber section. External sound waves enter the outer housing (from outside the device) through the microphone-associated case opening; they then, via an entirely straight path, travel through the front chamber section and reach a sound input port of the microphone. The input sound port may be located on a front face of the microphone, while an opposite, rear face is where one or more of the electrical signal input/output terminals of the microphone may be exposed. The microphone is fixed in the boot, within the rear chamber section, and its front face may be essentially perpendicular to the straight sound path (that goes through the front chamber section).

Another aspect of the invention is the manner in which an acoustic seal is created at the front of the microphone boot, which may prevent unwanted sound waves inside the device housing from leaking past the boot and then entering the microphone input sound port. The front chamber section of the boot is defined by the latter's front sidewall. This sidewall may extend from the mouth of the boot, all the way to where the boot's rear chamber section begins. A circumferential rib is formed on the outer surface of the sidewall. The rib may extend continuously, around the entire sidewall. This portion of the boot sidewall is disposed with a tube section (which may be formed in the sidewall of the device's outer case), to somehow form an acoustic seal around the mouth of the boot. In one embodiment, the front sidewall and mouth end of the boot (having the rib) may be inserted into the near end of the tube section. The tube section's far end is aligned with and extends inward from the microphone-associated case opening (in the outer housing sidewall). The tube is preferably straight end-to-end, though it may change in diameter. In one embodiment, an inner surface region of the tube is smoother and more rigid than the ribbed portion of the boot, such that the rib is compressed against that inner surface region (once the boot's front sidewall has been inserted into the tube).

The above summary does not include an exhaustive list of all aspects of the invention. It is contemplated that the invention includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now described. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
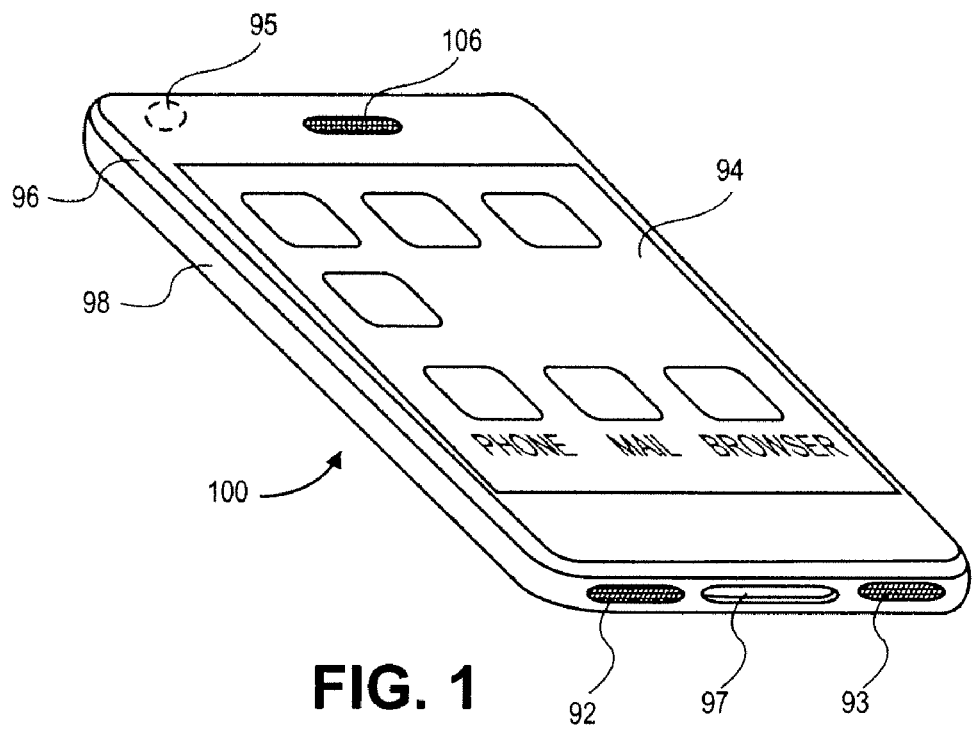
FIG. 1 shows an example, portable handheld electronic communications device.

FIG. 1 shows a portable handheld electronic communications device 100 (also referred to as a mobile device or a wireless device), such as an iPhone™ device by Apple Inc. of Cupertino, Calif., that has an improved acoustic arrangement for housing a microphone therein. Further details of the device 100 are described below in connection with another example wireless device 200 depicted in FIG. 6 and FIG. 7.

For now, it should be appreciated that the device 100 has an outer housing or case 12 that includes at least a front portion 96 and a mating rear portion 98 that when fitted to each other in large part define or close off a chamber in which the constituent electronic components of the device 100 are housed. The front and rear portions 96, 98 may have different heights, e.g. the rear portion may be significantly taller or deeper than the front portion 98. The housing also has an earphone port 95 to receive an earphone jack, a touch sensitive display screen 94, and a speaker located acoustic opening 92. To enable its use as a cellular or wireless telephone handset, the device 100 has a receiver located acoustic opening 106 for its receiver, in its top portion (above the screen 94), and a microphone located acoustic opening 93 located in its bottom portion (below the screen 94). A docking connector port 97 is located in the bottom side, between the microphone opening 93 and the speaker opening 92. Although not described here, the device 100 has within its outer housing the needed combination of electronic circuitry and stored software that operate the various input and output components (e.g., touch sensitive display, receiver, microphone, and antenna), to provide the user with mobile telephony functionality.

Figure 2:
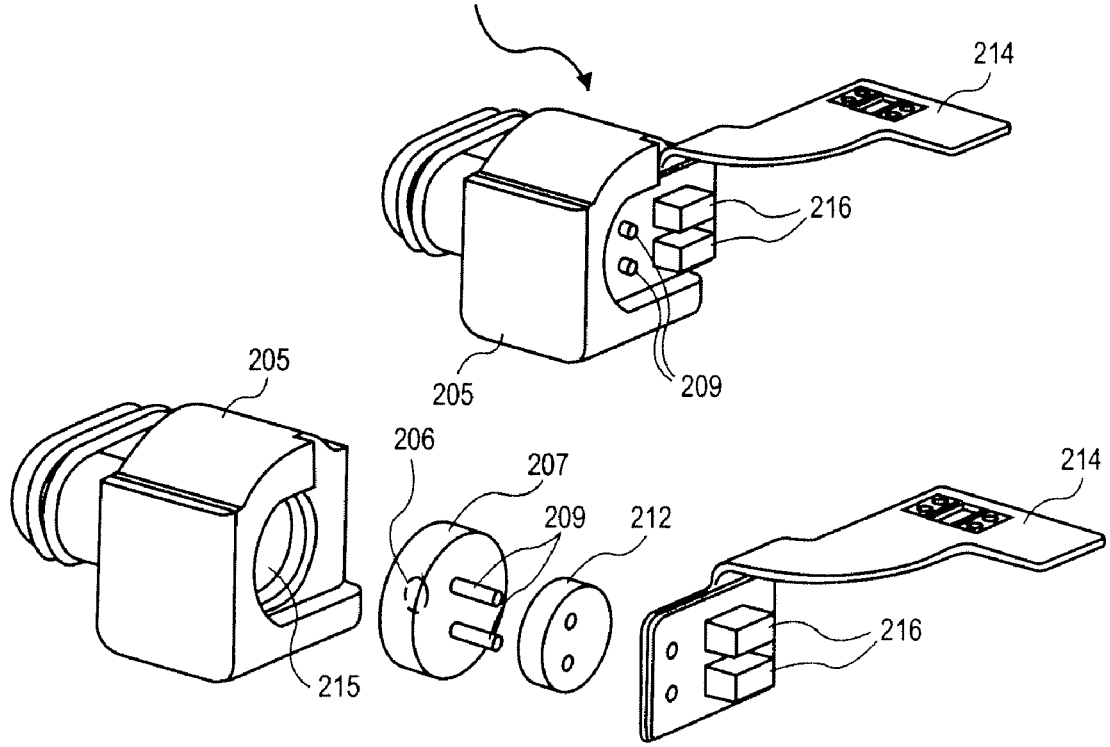
FIG. 2 is an exploded view and an assembled view of a microphone boot assembly for packaging of a microphone in the example device of FIG. 1.

FIG. 2 shows exploded and assembled views of components that make up part of the arrangement for packaging of a microphone 207 in the device 100. The microphone 207 itself has a front face in which is formed, in this case, its only, single, acoustic or sound input port 206 (there may be more than one such port clustered together in the front face of a microphone's outer case). In this example, a pair of terminals 209 (that provide the microphone's electrical audio output signal and power for its operation), emerge from the microphone's rear face. In general, there is at least one audio signal input/output terminal that emerges from the case of the microphone. The microphone 207 in this example has a case that is shaped like a disk whose front and rear faces are essentially equal area circles. Alternative shapes for the microphone 207 include, more generally, a solid that need not be flat and thin and regular like a disk. For instance, it may have unequal area front and rear faces. As another example, the microphone case may have non-circular front and/or rear faces, e.g. a cube.

Wires (e.g., a printed flexible circuit, PFC, 214) that will deliver power to operate the microphone and will conduct the microphone's input/output electrical audio signal, may be soldered to or may otherwise be in fixed contact with the terminals 209 (e.g., via spring forces). The PFC 214 in this case may also have a pair of electrical filters 216 (e.g., series inductors) connected to its wires, to prevent conducted noise in the device 100 from entering the microphone through the terminals 209. A spacer 212 may be fitted onto the terminals 209, prior to soldering or contacting the terminals 209 to the PFC 214, to yield a more sturdy or robust microphone boot assembly 204.

In addition to physically holding the microphone 207 in a fixed position inside the device 100, one embodiment of the boot assembly 204 (and related components outside of it) provide an engineered sound path for the input sound pressure waves (generated by the user speaking near the case opening 93 of the device 100) to travel into the acoustic input port 206 of the microphone 207, essentially along a straight line, i.e. without any substantial bends. This path is depicted as a dotted line in the cross section view of the example boot assembly 204 depicted in FIG. 3.

Figure 3:
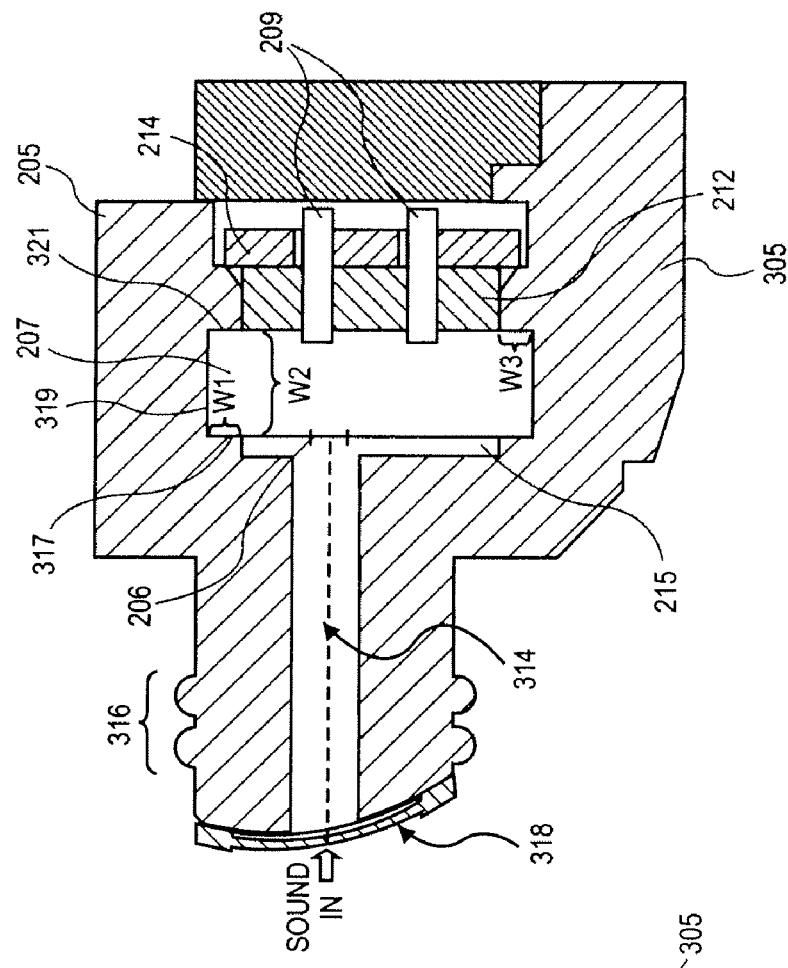
FIG. 3 is a cross section view of the microphone boot assembly.
Figure 4:
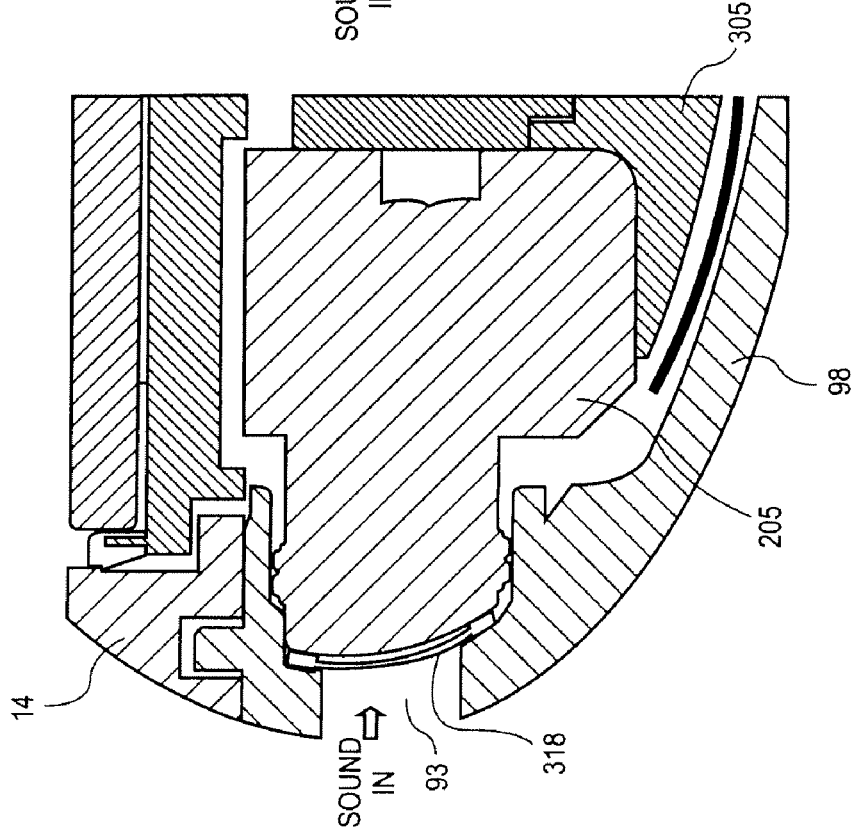
FIG. 4 is a cross section view of the microphone boot assembly installed within the example device of FIG. 1.
Figure 5:
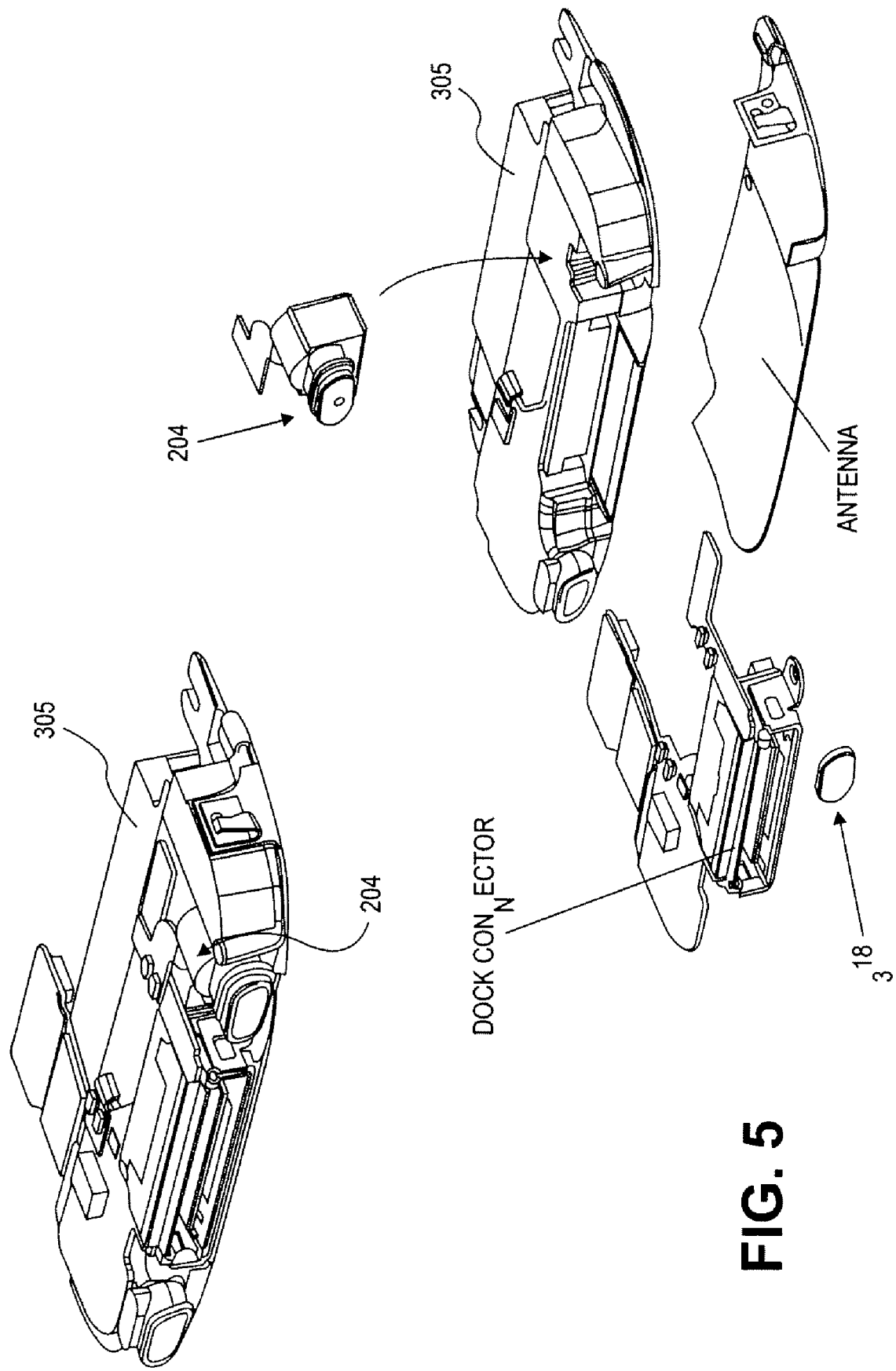
FIG. 5 shows exploded and assembled views of an acoustic module as a combination antenna carrier, microphone support (microphone boot assembly), and dock connector support.

The components shown in the exploded view of FIG. 2 are now described, with references made to the cross section views in FIG. 3 and FIG. 4. A boot 205 has a cavity formed therein in which the microphone 207 is captured or held in a fixed position relative to the boot. The boot 205 may be a single, molded piece, made of a flexible and resilient material such as rubber or silicone. Its cavity may be essentially closed off to provide a good acoustic seal all around it, except for a front opening (also referred to as a mouth) and a rear opening. Sound pressure waves are input through the front opening or mouth. The microphone 207 is to be inserted into the cavity, in this case through the rear opening of the boot 205. This may be done by first pushing or pulling outward the rear sidewall of the boot to widen its rear opening, until the microphone 207 can be inserted into its fixed position inside the boot, as shown in FIG. 3. Once the microphone has been inserted, the rear sidewall may then be released and, due to its resilient nature, will then collapse back to its original shape, thereby capturing or fixing the inserted microphone 207 in place as shown. Next, the spacer 212 and the PFC 214 may be fitted onto the terminals 209 as shown in the assembly view of FIG. 2 as well as in FIG. 3. The terminals 209 may then be soldered to or otherwise kept in fixed contact with their respective pads in the PFC 214. Referring now to FIG. 5, the boot assembly 204 may then be fitted into a pocket that has been formed in a sub-frame 305 within the housing, beside a pocket that will receive a dock connector. The sub-frame 305 may thus be viewed as an acoustic module of the device 100.

Further details of the boot 205 are now described. The cavity of the boot 205 may be viewed as having at least two chamber sections or chambers. A front chamber section 314 (see FIG. 3) may be substantially cylindrical (or otherwise engineered to present improved acoustic characteristic impedance to the input sound waves). It is defined by a front sidewall and extends from the front opening of the boot 205 (through which input sound pressure waves enter the boot) to a substantially cylindrical rear chamber section 215. The front chamber section 314 at its back opens into the rear chamber section 215, the latter having a larger diameter in this case to accommodate the microphone case.

The rear chamber section 215 may be defined by a rear sidewall of the boot 205 whose internal surface is stepped as shown. The rear sidewall may have at least the following three segments in sequence, to yield the "back seal" of the boot 205, relative to the microphone 207. A first sealing segment 317 faces rearward and is in contact with (thereby sealing) a strip w1 in and around the entire front face of the installed microphone 207. In this example, the segment 317 is annular given the disk shape of the microphone 207, and it is positioned to be at the edge of the periphery of the front face of the installed microphone 207. Next, a second sealing segment 319 is in contact with (thereby sealing) a strip w2 in and around the entire sidewall of the microphone 207. In this case, the segment 319 is annular due to the disk shape of the microphone case, and its width is essentially the same as the thickness of the disk. Finally, a third sealing segment 321 faces forward and is in contact with (thereby sealing) a strip w3 in and all around the entire rear face of the microphone 207. In this example, the segment 319 is annular in view of the disk shaped microphone, and it is positioned to be at the edge of the periphery of the rear face of the microphone. The sealing segments 317, 319 and 321 thus help reduce the likelihood of sound waves that are inside the housing of the device 100 leaking past the side of the microphone 207 and into the front chamber section 314 (where they would enter the microphone acoustic port 206).

Referring now to FIG. 4, this figure is a cross section view of the boot 205 whose bottom, rear end has been fitted into a pocket in the sub-frame 305. The bottom, rear end of the boot 205 includes the portion of the boot's rear sidewall that defines the rear chamber section 215 and lies below the chamber section 314 (see FIG. 3). That portion of the sidewall fits into a pocket formed in the sub-frame 305, which is defined by a floor and two opposite sidewalls. The width of the floor and the height of the sidewalls are selected so as to securely hold the boot assembly 204 between them (see the zoomed out view in FIG. 5).

As to the front end of the boot 205, that portion has been fitted into a tube section that may be formed in or integrated with the lower portion 98, and in particular a sidewall of, the housing 12, to obtain a further acoustic seal. The tube section and the opening 93 shown in this example are coextensive and have a lozenge shape, although other shapes are possible, e.g. circle; oval. In this arrangement, the front face of the microphone 207, in which the port 206 is formed, is essentially vertical relative to the essentially horizontal sound path (shown as a dotted line) that passes through tube section and the joined front chamber section 314, as depicted in FIG. 3.

In addition to a back seal, the microphone boot assembly 204 may also enjoy a "front seal." Still referring to FIG. 4, the front sidewall of the microphone boot 205 refers to the portion of the boot's sidewall that substantially defines the front chamber section 314 (see FIG. 3). At least one circumferential rib 316 (in this example, two) is formed on the outer surface of the front sidewall. In this case, the ribs 316 extend continuously around the entire sidewall, as opposed to just a sector or portion of it. This may create a complete seal around the opening 93 in the housing wall and around the mouth of the boot 205. For example, the ribs 316 may be compressed against the relatively smooth and more rigid inside surface of the short tube section that extends inward from the opening 93 in the outer housing portion 98, around the entire opening 93 (see FIG. 4). Another way to obtain the front seal is for the rib 316 to fit into a corresponding circumferential groove that has been formed in the inside surface of the tube section (when the boot 205 is inserted into the tube section). The front seal helps prevent sound waves inside the housing 12 from leaking past the front sidewall of the boot 205, where they can then enter through the front opening of the boot 205 and then be picked up by the microphone 207 (along with the input sound pressure waves from outside the device).

When assembling the device 100, the boot assembly 204 may first be fitted into the sub-frame 305 to form the acoustic module (see FIG. 5). The front of the boot assembly 204 is then aligned with the tube that extends inward from the opening 93, and the sub-frame 305 may then be pushed forward so that front of the booth including the ribs 316 are wedged into the tube, as shown in FIG. 5.

In FIGS. 3-5, the front face of the boot 205 (out of which the chamber section 314 opens) is fitted with a microphone opening guard 318. The guard 318 may have a sandwich structure comprising a grill in front of an acoustic foam or mesh. The grill may have been woven or otherwise fabricated to have regularly spaced openings between the chords of a net structure. The chord material may be metal (e.g., brass) or other suitable material for fabricating such a structure. The grill serves to protect against objects being inserted into the device 100 that might otherwise damage the underlying mesh or acoustic opening of the boot assembly 203. The openings in the grill should be selected to provide the needed strength to withstand entry of foreign objects into the case of the device 100, while at the same time being acoustically transparent to allow an essentially fully open passage for input sound pressure waves to reach the microphone. The grill may be a single piece that has an area large enough to cover the front opening of the boot 205 as well as the larger opening 93 in the housing.

The mesh may be a piece of acoustically engineered material that provides a defined and intentional acoustic resistance or filtering effect. The mesh may be pressed or sandwiched between a rear face of the grill and the front face of the boot 205, entirely covering the opening 93 as shown. The mesh, in addition to improving the microphone sound path, may act as a dust cover. The mesh may be a single piece that has an area that is large enough to cover the entire opening 93, and that is equal to or smaller than the entire area of the front face of the boot 205.

The guard 318 may be assembled first by attaching the mesh to the rear face of the grill by a strip of bonding agent such as pressure sensitive adhesive, PSA, surrounding but not blocking the path of the input sound waves. This type of assembly process is depicted in FIG. 5. The assembled guard 318 may then be attached to the front face of the boot assembly 203, by another layer of PSA for example that surrounds but does not block the front acoustic opening of the boot 205. Lastly, a further PSA layer may be applied to the periphery of the front face of the grill, to bond with the rear facing surface inside the tube that extends inward from the opening 93 in the lower portion 98 of the housing (see FIG. 4). In addition to their bonding functions, the three PSA layers described here also act as gaskets to further acoustically seal the front of the boot (thereby preventing sound waves inside the device 100 from leaking past the outside of the front sidewall of the boot and into the region in front of the opening 93).

Additional Details of an Example Mobile Device

Figure 6:
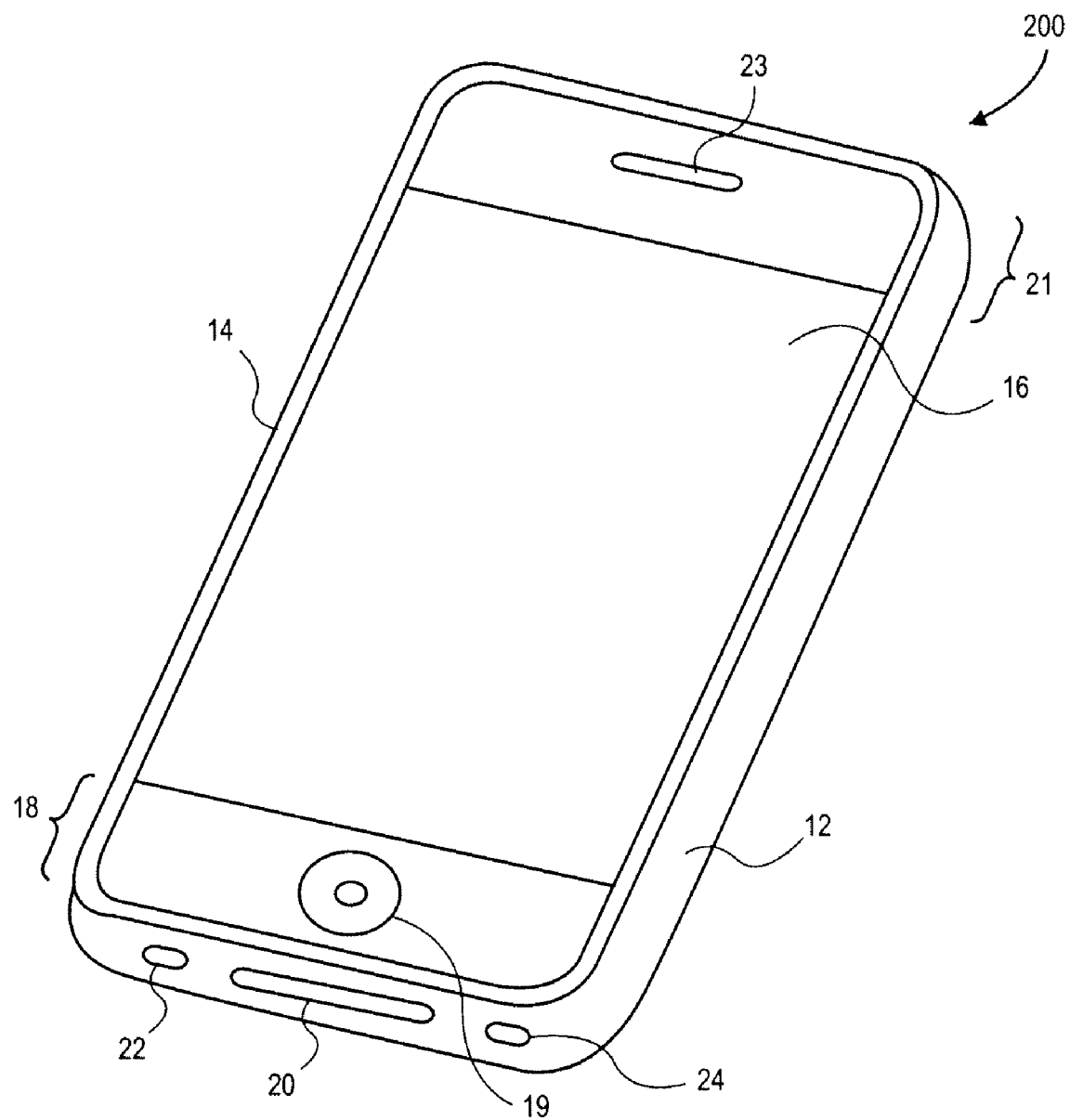
FIG. 6 shows an example wireless electronic device that may have the microphone acoustic arrangement of FIG. 2.
Figure 7:
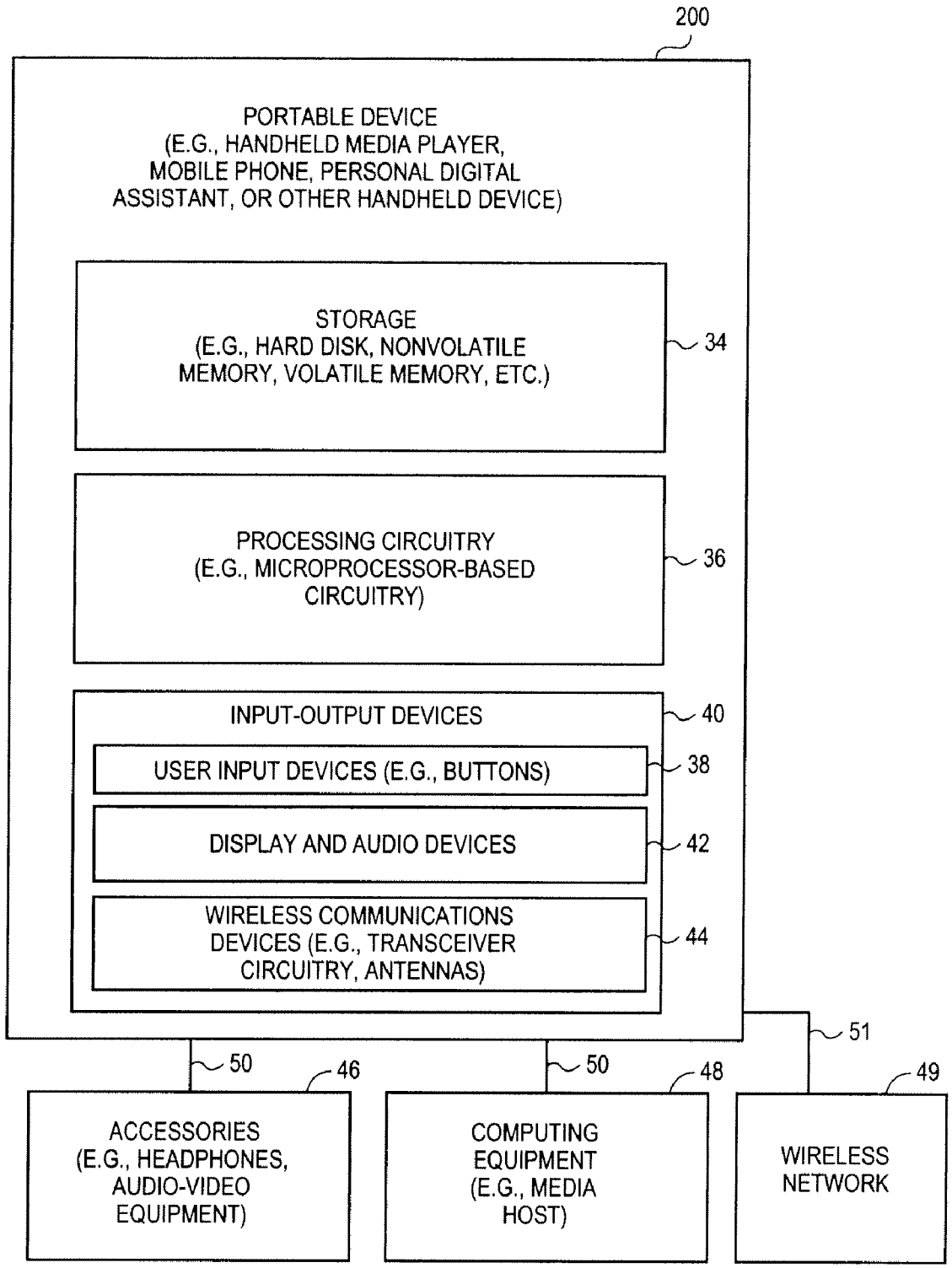
FIG. 7 is a block diagram of the electronic components that make up the wireless electronic device of FIG. 6.

Referring now to FIGS. 6-7, further details of a wireless electronic device 200 that may have the microphone acoustic arrangement described above are now described. The device 200 may be, for example, a cellular telephone, a media player with wireless communications capabilities, or a hybrid device (such as the iPhone™ device) that combines several functions, including wireless telephony, web browsing, digital media player, and global positioning system, into the same handset unit. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

The housing 12 may be formed of any suitable materials including, plastic, glass, ceramics, metal, or other suitable materials, or a combination of these materials. In some situations, the entire housing 12 or portions of the housing 12 may be formed from a dielectric or other low-conductivity material, so that the operation of conductive antenna elements of the device 200 that are located within or in proximity to housing 12 is not disrupted. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 200, such as stainless steel, magnesium, titanium, alloys of these metals and other metals, etc. In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 200.

Housing 12 may have a bezel 14. The bezel 14 may be formed from a conductive material and may serve to hold a display or other device with a planar surface in place on device 200. As shown in FIG. 6, for example, bezel 14 may be used to hold display 16 in place by attaching display 16 to the upper or front portion 96 of the housing 12 (see FIG. 1).

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 200 may have other input-output devices. For example, electronic device 200 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. Speaker port 22 may be used when operating device 200 in speakerphone mode. Opening 23 may also form a speaker port. For example, speaker port 23 may serve as a telephone receiver port that is placed adjacent to a user's ear during operation. In the example of FIG. 6, display screen 16 is shown as being mounted on the front face of handheld electronic device 200, but display screen 16 may, if desired, be mounted on the rear face of handheld electronic device 200, on a side of device 200, on a flip-up portion of device 200 that is attached to a main body portion of device 200 by a hinge (for example), or using any other suitable mounting arrangement.

A user of electronic device 200 may supply input commands using user input interface devices such as button 19 and touch screen 16. Suitable user input interface devices for electronic device 200 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 200. Although shown schematically as being formed on the top face of electronic device 200 in the example of FIG. 6, buttons such as button 19 and other user input interface devices may generally be formed on any suitable portion of electronic device 200. For example, a button such as button 19 or other user interface control may be formed on the side of electronic device 200. Buttons and other user interface controls can also be located on the top face, rear face, or other portion of device 200. If desired, device 200 can be controlled remotely (e.g., using an infrared remote control, a radio-frequency remote control such as a Bluetooth® remote control, etc.).

Electronic device 200 may have ports such as port 20. Port 20, which may sometimes be referred to as a dock connector, 30-pin data port connector, input-output port, or bus connector, may be used as an input-output port (e.g., when connecting device 200 to a mating dock connected to a computer or other electronic device). Port 20 may contain pins for receiving data and power signals. Device 200 may also have audio and video jacks that allow device 200 to interface with external components. Typical ports include power jacks to recharge a battery within device 200 or to operate device 200 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 200 can be controlled using input interface devices such as touch screen display 16.

Components such as display 16 and other user input interface devices may cover most of the available surface area on the front face of device 200 (as shown in the example of FIG. 6) or may occupy only a small portion of the front face of device 200. Because electronic components such as display 16 often contain large amounts of metal (e.g., as radio-frequency shielding), the location of these components relative to the antenna elements in device 200 should generally be taken into consideration. Suitably chosen locations for the antenna elements and electronic components of the device will allow the antennas of electronic device 200 to function properly without being disrupted by the electronic components.

Examples of locations in which antenna structures may be located in device 200 include region 18 and region 21. These are merely illustrative examples. Any suitable portion of device 200 may be used to house antenna structures for device 200 if desired.

A schematic diagram of an embodiment of an illustrative portable electronic device such as a handheld electronic device is shown in FIG. 7. Portable device 200 may be a mobile telephone, a mobile telephone with media player capabilities, a handheld computer, a remote control, a game player, a global positioning system (GPS) device, a laptop computer, a tablet computer, an ultra-portable computer, a combination of such devices, or any other suitable portable electronic device.

As shown in FIG. 7, device 200 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 200. Processing circuitry 36 may be based on a processor such as a microprocessor and other suitable integrated circuits. With one suitable arrangement, processing circuitry 36 and storage 34 are used to run software on device 200, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, etc.

To minimize power consumption, processing circuitry 36 may include power management circuitry to implement power management functions. For example, processing circuitry 36 may be used to adjust the gain settings of amplifiers (e.g., radio-frequency power amplifier circuitry) on device 200. Processing circuitry 36 may also be used to adjust the power supply voltages that are provided to portions of the circuitry on device 200. For example, higher direct-current (DC) power supply voltages may be supplied to active circuits and lower DC power supply voltages may be supplied to circuits that are less active or that are inactive. If desired, processing circuitry 36 may be used to implement a control scheme in which the power amplifier circuitry is adjusted to accommodate transmission power level requests received from a wireless network.

Input-output devices 38 may be used to allow data to be supplied to device 200 and to allow data to be provided from device 200 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 200 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 200 can communicate with external devices such as accessories 46, computing equipment 48, and wireless network 49 as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 200. The computer may be a server (e.g., an internet server), a local area network computer with or without internet access, a user's own personal computer, a peer device (e.g., another portable electronic device 200), or any other suitable computing equipment.

Wireless network 49 may include any suitable network equipment, such as cellular telephone base stations, cellular towers, wireless data networks, computers associated with wireless networks, etc. For example, wireless network 49 may include network management equipment that monitors the wireless signal strength of the wireless handsets (cellular telephones, handheld computing devices, etc.) that are in communication with network 49.

The invention is not limited to the specific embodiments described above. For example, in FIG. 4, the lower portion 98 of the device 100's housing 12 is more than half the outside height of the device 100. As an alternative, the lower portion 98 and the upper portion 96 may each be about one half the height of the device 100. Accordingly, other embodiments are within the scope of the invention.

What is claimed is:

1. A mobile communications device comprising:
an outer case having a sidewall in which a microphone-associated acoustic hole is formed;
a resilient boot located inside the outer case, the boot having a front chamber defined by a front sidewall and a rear chamber defined by a rear sidewall, the front sidewall and the rear sidewall being separate from the outer case sidewall, wherein the front chamber at one end opens to a mouth of the boot that is aligned with the microphone-associated acoustic hole, and at another end joins the rear chamber, wherein the one end of the front chamber is joined to its another end entirely by a straight section; and
a microphone having a front face in which its input sound port is formed, the microphone being fixed within the rear chamber such that the front face is essentially perpendicular to the straight section of the boot.

2. The mobile communications device of claim 1 further comprising:
an electrical input/output signal terminal exposed through an opposite, rear face of the microphone.

3. The mobile communications device of claim 1 wherein the front sidewall extends from the mouth of the boot to the rear chamber, and a circumferential rib is formed on an outer surface of the front sidewall.

4. The mobile communications device of claim 3 further comprising:
a tube section having a far end that is aligned with the microphone-associated case opening, the tube section extends inward from the microphone-associated case opening, wherein the portion of the front sidewall of the boot that contains the rib is disposed within the tube section to form an acoustic seal around the mouth of the boot.

5. The mobile communications device of claim 4 wherein the tube section is formed in the sidewall of the outer case.

6. The mobile communications device of claim 5 wherein the tube section is straight end-to-end.

7. The mobile communications device of claim 6 wherein the rib extends continuously around the entire front sidewall.

8. The mobile communications device of claim 7 wherein an inner surface region of the tube is smoother and more rigid than the portion of the boot containing the rib, such that the rib is compressed against that inner surface region.

9. The mobile communications device of claim 4 wherein the rib extends continuously around the entire front sidewall and is compressed against an inner surface region of the tube.

10. The mobile communications device of claim 1 wherein the front chamber and the rear chamber are substantially cylindrical and a diameter of the front chamber is different than a diameter of the rear chamber.

11. The mobile communications device of claim 10 wherein the diameter of the front chamber is less than the diameter of the rear chamber.

12. A mobile communications device comprising:
an outer case having a sidewall in which a microphone-associated acoustic hole is formed;
a microphone having an input sound port;
a microphone boot located inside the outer case, a mouth of the boot being aligned with the microphone-associated acoustic hole, the boot having a front chamber and a rear chamber therein, the microphone being fixed in the rear chamber so that its input sound port can receive sound that comes into the device through the hole in the outer case sidewall and through the front chamber,
the microphone boot having a front sidewall that defines the front chamber, the front sidewall extends from the mouth of the boot to the rear chamber, and a circumferential rib formed on an outer surface of the front sidewall; and a tube section having a far end that is aligned with the microphone-associated case opening, the tube section extends inward from the microphone-associated case opening, wherein the portion of the front sidewall of the boot that contains the rib is disposed within the tube section to form an acoustic seal around the mouth of the boot.

13. The mobile communications device of claim 12 wherein the tube section is formed in the sidewall of the outer case.

14. The mobile communications device of claim 13 wherein the tube section is straight end-to-end.

15. The mobile communications device of claim 14 wherein the rib extends continuously around the entire sidewall.

16. The mobile communications device of claim 15 wherein an inner surface region of the tube is smoother and more rigid than the portion of the boot containing the rib, such that the rib is compressed against that inner surface region.

17. The mobile communications device of claim 12 wherein the rib extends continuously around the entire sidewall and is compressed against an inner surface region of the tube.

* * * * *